United States Patent
Li et al.

(10) Patent No.: US 10,951,296 B1
(45) Date of Patent: Mar. 16, 2021

(54) DIRECTION-CONTROLLED PAPR REDUCTION

(71) Applicant: QUALCOMM Incorporated, San Diego, CA (US)

(72) Inventors: Junyi Li, Chester, NJ (US); Juergen Cezanne, Ocean Township, NJ (US); Guy Wolf, Rosh Haayin (IL); Assaf Touboul, Netanya (IL); Noam Zach, Kiryat Ono (IL); Ory Eger, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/025,445

(22) Filed: Sep. 18, 2020

(51) Int. Cl.
*H04B 7/02* (2018.01)
*H04B 7/06* (2006.01)
*H04B 7/0417* (2017.01)
*H04L 27/26* (2006.01)

(52) U.S. Cl.
CPC ......... *H04B 7/0686* (2013.01); *H04B 7/0417* (2013.01); *H04B 7/0639* (2013.01); *H04L 27/2614* (2013.01)

(58) Field of Classification Search
CPC .. H04B 7/0686; H04B 7/0417; H04B 7/0639; H04L 27/2614
USPC ................ 375/267, 260, 259, 316, 219, 295
See application file for complete search history.

(56) References Cited

U.S. PATENT DOCUMENTS

2020/0119962 A1* 4/2020 Nammi ............... H04L 27/2626

* cited by examiner

*Primary Examiner* — Zewdu A Kassa
(74) *Attorney, Agent, or Firm* — Haynes and Boone, LLP

(57) ABSTRACT

A direction-controlled PAPR reduction is provided in which a base station transmits a PAPR reduction signal using a subset of antenna beams selected from a null space plurality of antenna beams. The subset of antenna beams is selected such that the PAPR reduction signal is not directed having a relatively-high path gain to a UE and/or so that the PAPR reduction signal power is concentrated in directions that have a relatively-lo path gain to the UE.

31 Claims, 8 Drawing Sheets

DIRECTION-CONTROLLED PAPR REDUCTION

TECHNICAL FIELD

The technology discussed below relates generally to wireless communication systems, and more particularly, to wireless communication with direction-controlled peak-to-average-power (PAPR) reduction.

BACKGROUND

To meet the growing demands for expanded mobile broadband connectivity, wireless communication technologies are advancing from the long term evolution (LTE) technology to a next generation new radio (NR) technology, which may also be referred to as $5^{th}$ Generation (5G). For example, NR is designed to provide a lower latency, a higher bandwidth or a higher throughput, and a higher reliability than LTE. To provide these advantages, 5G uses orthogonal frequency division multiplexing (OFDM).

OFDM provides high spectral efficiency but is associated with an elevated peak-to-average power ratio (PAPR). High PAPR complicates the biasing of the power amplifiers in the transmitters. To achieve a suitable output power competence, a power amplifier should be biased so that the average power of its output signal is at or close to its saturation region. But such biasing then results in clipping of the peak power portions of the OFDM signal. To properly bias the power amplifiers while addressing the clipping noise, null-space-based PAPR reduction techniques have been developed for multiple-input multiple-output (MIMO) OFDM. Adaptive PAPR reduction transmits a PAPR reduction signal into the null space of the MIMO channel matrix.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with a first aspect of the disclosure, a method of wireless communication for a base station is provided that includes: transmitting a message through a channel to a first user equipment (UE) using a first antenna beam; transmitting a first reference signal using a second antenna beam, the second antenna beam being part of a null-space plurality of antenna beams that are projected into a null space for the channel; receiving a first reference signal report from the first UE responsive to the transmission of the first reference signal; and transmitting a peak-to-average-power (PAPR) reduction signal using a direction-controlled PAPR subset of antenna beams selected from the null space plurality of antenna beams responsive to the first reference signal report to reduce a PAPR for the message.

In accordance with a second aspect of the disclosure, a base station is provided that includes: a transceiver; and a processor configured to: command the transceiver to transmit a message through a channel to a first user equipment (UE) using a first antenna beam; command the transceiver to transmit a first reference signal using a second antenna beam, the second antenna beam being part of a null-space plurality of antenna beams that are projected into a null space for the channel; process a first reference signal report from the first UE responsive to the transmission of the first reference signal; and command the transceiver to transmit a peak-to-average-power (PAPR) reduction signal using a direction-controlled PAPR subset of antenna beams selected from the null-space plurality of antenna beams responsive to the processing of the first reference signal report.

In accordance with a third aspect of the disclosure, a method of wireless communication for a user equipment is provided that includes: receiving a first reference signal over a first serving antenna beam from a base station; receiving a second reference signal over a second antenna beam from the base station; selecting a first precoding matrix responsive to a processing of the first reference signal; selecting a second precoding matrix responsive to a processing of the second reference signal; transmitting a reference signal report to the base station that identifies the first precoding matrix and the second precoding matrix; and receiving a message from the base station over the first serving beam having an increased peak-to-power ratio (PAPR) responsive to the transmission of the reference signal report.

In accordance with a fourth aspect of the disclosure, a user equipment is provided that includes: a transceiver configured to receive a first reference signal over a serving antenna beam from a base station and configured to receive a second reference signal over a null-space antenna beam from the base station, and a processor configured to select a first precoding matrix responsive to a processing of the first reference signal and to select a second precoding matrix responsive to a processing of the second reference signal, the processor being further configured to command the transceiver to transmit a reference signal report to the base station that identifies the first precoding matrix and the second precoding matrix, wherein the transceiver is further configured to receive a message over the serving antenna beam from the base station having an increased peak-to-average power ratio (PAPR) responsive to the transmission of the reference signal report.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
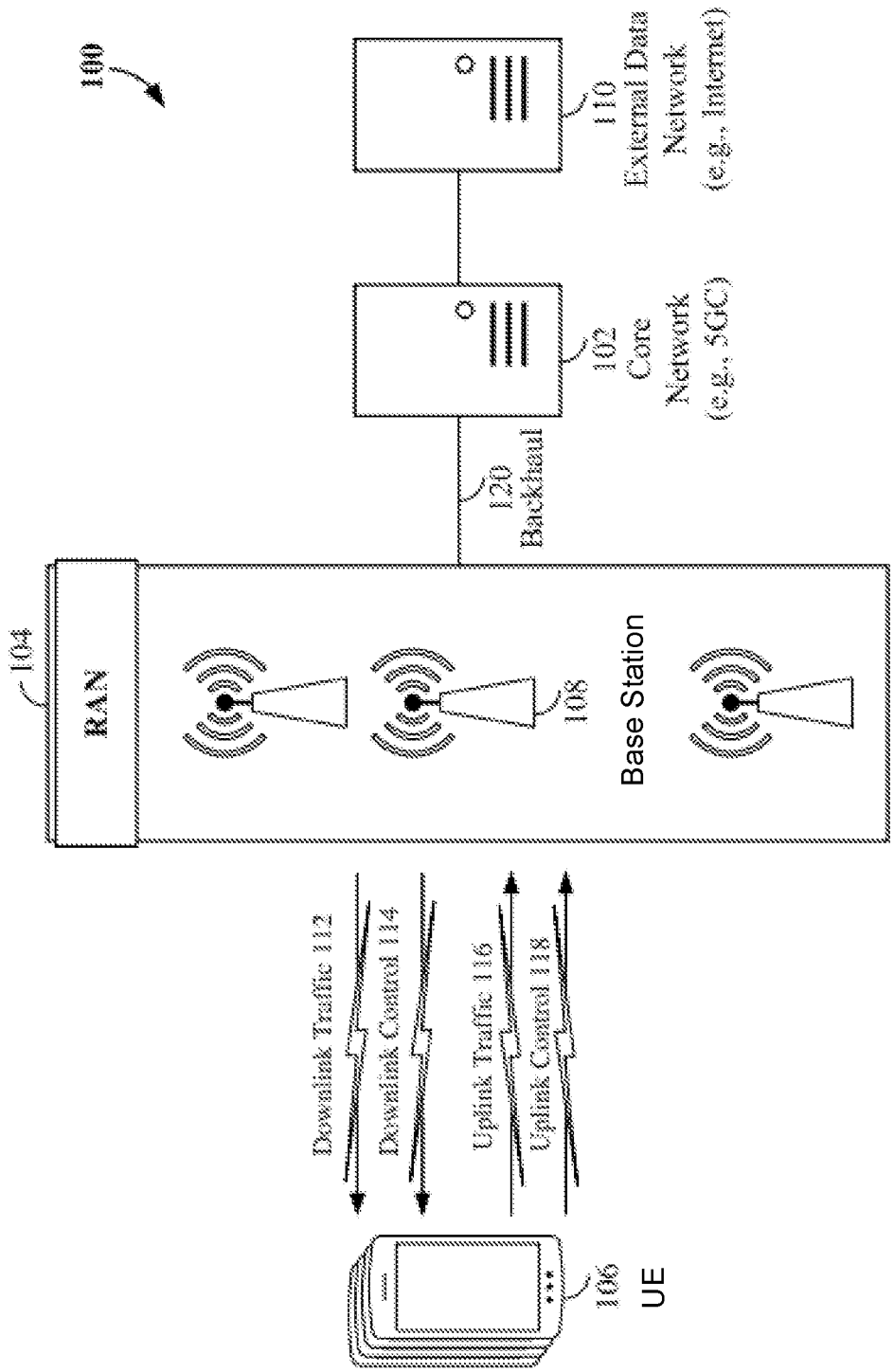
FIG. 1 is a schematic illustration of a wireless communication system according to some aspects of the disclosure.

A direction-controlled PAPR reduction technique is disclosed using a null-space-based PAPR reduction in which a base station transmits a PAPR reduction signal (clipping noise) into the channel null space of the channel vector. In contrast to conventional null-space-based PAPR reduction, the direction-controlled PAPR reduction disclosed herein uses only a subset of the channel null space. In particular, the base station avoids transmitting the PAPR reduction signal in directions that result in self-interference at a receiving user equipment (UE) and/or concentrates the PAPR reduction signal in directions having relatively-low path gains to the UE. The following discussion will assume that the base station is a multi-user multiple-input-multiple output (MU MIMO) base station although the direction-controlled PAPR reduction technique disclosed herein is also applicable to a single-user (SU) MIMO base station.

In conventional null-space-based PAPR reduction, the base station uses the channel null space without restriction. As will be explained further herein, the resulting un-restricted use of the channel null space may result in an undesirable self-interference at a receiving UE. But direction-controlled PAPR reduction eliminates or substantially reduces such self-interference. The following discussion will assume that the base station uses OFDM but it will be appreciated that other modulations that suffer from high PAPR would also benefit from the disclosed direction-controlled PAPR reduction. To provide a better appreciation of the advantageous PAPR reduction improvements disclosed herein, some 5G concepts will be reviewed initially, following by a more detailed discussion of direction-controlled PAPR reduction.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Legacy compatibility: may refer to the capability of a 5G network to provide connectivity to pre-5G devices, and the capability of 5G devices to obtain connectivity to a pre-5G network.

Multimode device: a device that can provide simultaneous connectivity across different networks, such as 5G, 4G, and Wi-Fi networks.

CA: carrier aggregation. 5G networks may provide for aggregation of sub-6 GHz carriers, above-6 GHz carriers, mmWave carriers, etc., all controlled by a single integrated MAC layer.

MR-AN: multi-RAT radio access network. A single radio access network may provide one or more cells for each of a plurality of RATs, and may support inter- and intra-RAT mobility and aggregation.

MR-CN: multi-RAT core network. A single, common core network may support multiple RATs (e.g., 5G, LTE, and WLAN). In some examples, a single 5G control plane may support the user planes of a plurality of RATs by utilizing software-defined networking (SDN) technology in the core network.

SDN: software-defined networking. A dynamic, adaptable network architecture that may be managed by way of abstraction of various lower-level functions of a network, enabling the control of network functions to be directly programmable.

SDR: software-defined radio. A dynamic, adaptable radio architecture where many signal processing components of a radio such as amplifiers, modulators, demodulators, etc. are replaced by software functions. SDR enables a single radio device to communicate utilizing different and diverse waveforms and RATs simply by reprogramming the device.

mmWave: millimeter-wave. Generally refers to high frequency bands above 24 GHz, which can provide a very large bandwidth.

Beamforming: directional signal transmission or reception. For a beamformed transmission, the amplitude and phase of each antenna in an array of antennas may be precoded, or controlled to create a desired (e.g., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.
1. In single-user MIMO, the transmitter sends one or more streams to the same receiver, taking advantage of capacity gains associated with using multiple Tx, Rx antennas in rich scattering environments where channel variations can be tracked.
2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded by a precoding matrix to maximize throughput for users and minimize inter-user interference.

AS: access stratum. A functional grouping consisting of the parts in the radio access network and in the UE, and the protocols between these parts being specific to the access technique (i.e., the way the specific physical media between the UE and the radio access network is used to carry information).

NAS: non-access stratum. Protocols between UE and the core network that are not terminated in the radio access network.

RAB: radio access bearer. The service that the access stratum provides to the non-access stratum for transfer of user information between a UE and the core network.

Network slicing: a wireless communication network may be separated into a plurality of virtual service networks (VSNs), or network slices, which are separately configured to better suit the needs of different types of services. Some wireless communication networks may be separated, e.g., according to eMBB, IoT, and ultra-reliable low-latency communication (URLLC) services.

eMBB: enhanced mobile broadband. Generally, eMBB refers to the continued progression of improvements to existing broadband wireless communication technologies such as LTE. eMBB provides for (generally continuous) increases in data rates and increased network capacity.

IoT: the Internet of things. In general, this refers to the convergence of numerous technologies with diverse use cases into a single, common infrastructure. Most discussions of the IoT focus on machine-type communication (MTC) devices.

Duplex: a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and interference cancellation techniques. Full duplex emulation is frequently implemented for wireless links by utilizing frequency division duplex (FDD) or time division duplex (TDD). In FDD, the transmitter and receiver at each endpoint operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction.

OFDM: orthogonal frequency division multiplexing. An air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

RSMA: resource spread multiple access. A non-orthogonal multiple access scheme generally characterized by small, grantless data bursts in the uplink where signaling over head is a key issue, e.g., for IoT.

QoS: quality of service. The collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

RRH: remote radio head (also called a remote radio unit (RRU). A remote radio transceiver that connects to an operator radio control panel. An RRH contains a base station's RF circuitry plus analog-to-digital/digital-to-analog converters and up/down converters. RRHs also have operation and management processing capabilities and an interface to connect to the rest of the base station.

RSRP: reference signal receive power. The linear average over the power contributions of resource elements (REs) that carry cell-specific reference signals within a considered measurement frequency bandwidth.

DCI: downlink control indicator. A set of information transmitted at the L1 Layer that, among other things, schedules the downlink data channel (e.g., PDSCH) or the uplink data channel (e.g., PUSCH).

MAC-CE: media access control-control element. A MAC structure used for carrying MAC layer control information between a gNB and a UE. The structure may be implemented as a special bit string in a logical channel ID (LCID) field of a MAC Header.

Turning to the drawings, the various concepts presented throughout this disclosure may be implemented across a broad variety of telecommunication systems, network architectures, and communication standards. Referring to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station 108. Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE 106.

In some examples, a base station 108 allocates resources for communication among some or all devices and equipment within its service area or cell. Within the present disclosure, as discussed further below, the base station 108 may be responsible for scheduling, assigning, reconfiguring, and releasing resources for one or more UEs 106.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
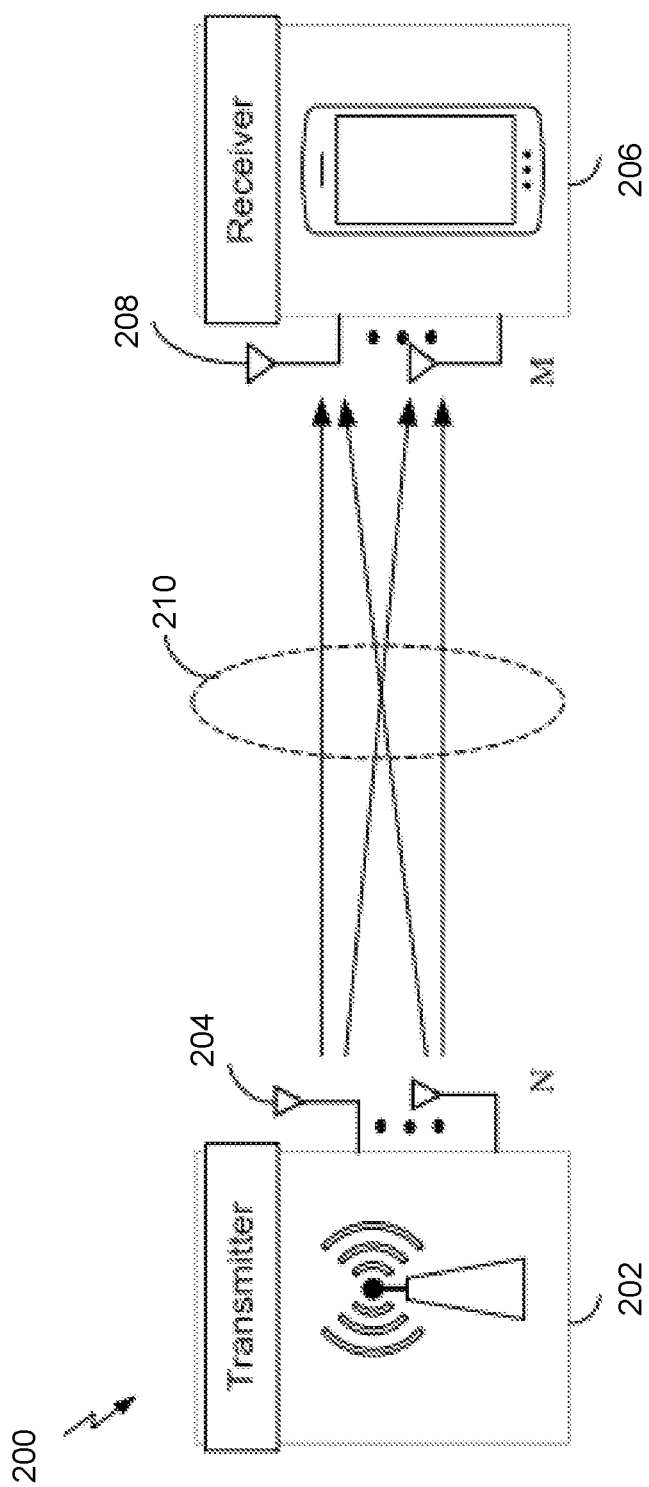
FIG. 2 is a block diagram illustrating a wireless communication system supporting multiple-input multiple-output (MIMO) communication in accordance with an aspect of the disclosure.

In some aspects of the disclosure, the scheduling entity and/or scheduled entity may be configured for beamforming and/or multiple-input multiple-output (MIMO) technology. FIG. 2 illustrates an example of a wireless communication system 200 supporting MIMO. In a MIMO system, a transmitter 202 includes multiple transmit antennas 204 (e.g., N transmit antennas) and a receiver 206 includes multiple receive antennas 208 (e.g., M receive antennas). Thus, there are N×M signal paths 210 from the transmit antennas 204 to the receive antennas 208. Each of the transmitter 202 and the receiver 206 may be implemented, for example, within a base station 108, a UE 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 200 is limited by the number of transmit or receive antennas 204 or 208, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE 106 to the base station 108. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit a channel-state information reference signal (CSI-RS) with separate channel reference signal (C-RS) sequences for each layer to provide for multi-layer channel estimation. From the CSI-RS, the UE may measure the channel quality across layers and resource blocks and provide the CQI and RI values to the base station for use in updating the rank and assigning REs for future downlink transmissions.

In the simplest case, as shown in FIG. 2, a rank-2 spatial multiplexing transmission on a 2×2 MIMO antenna configuration will transmit one data stream from each transmit antenna 204. Each data stream reaches each receive antenna 208 along a different signal path 210. The receiver 206 may then reconstruct the data streams using the received signals from each receive antenna 208.

The air interface in the system 200 may utilize one or more multiplexing and multiple access algorithms to enable simultaneous communication of the various devices. For example, 5G NR specifications provide multiple access for UL transmissions from UEs 106 to a base station 108, and for multiplexing for DL transmissions from the base station 108 to one or more UEs 106, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 108 to UEs 106 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
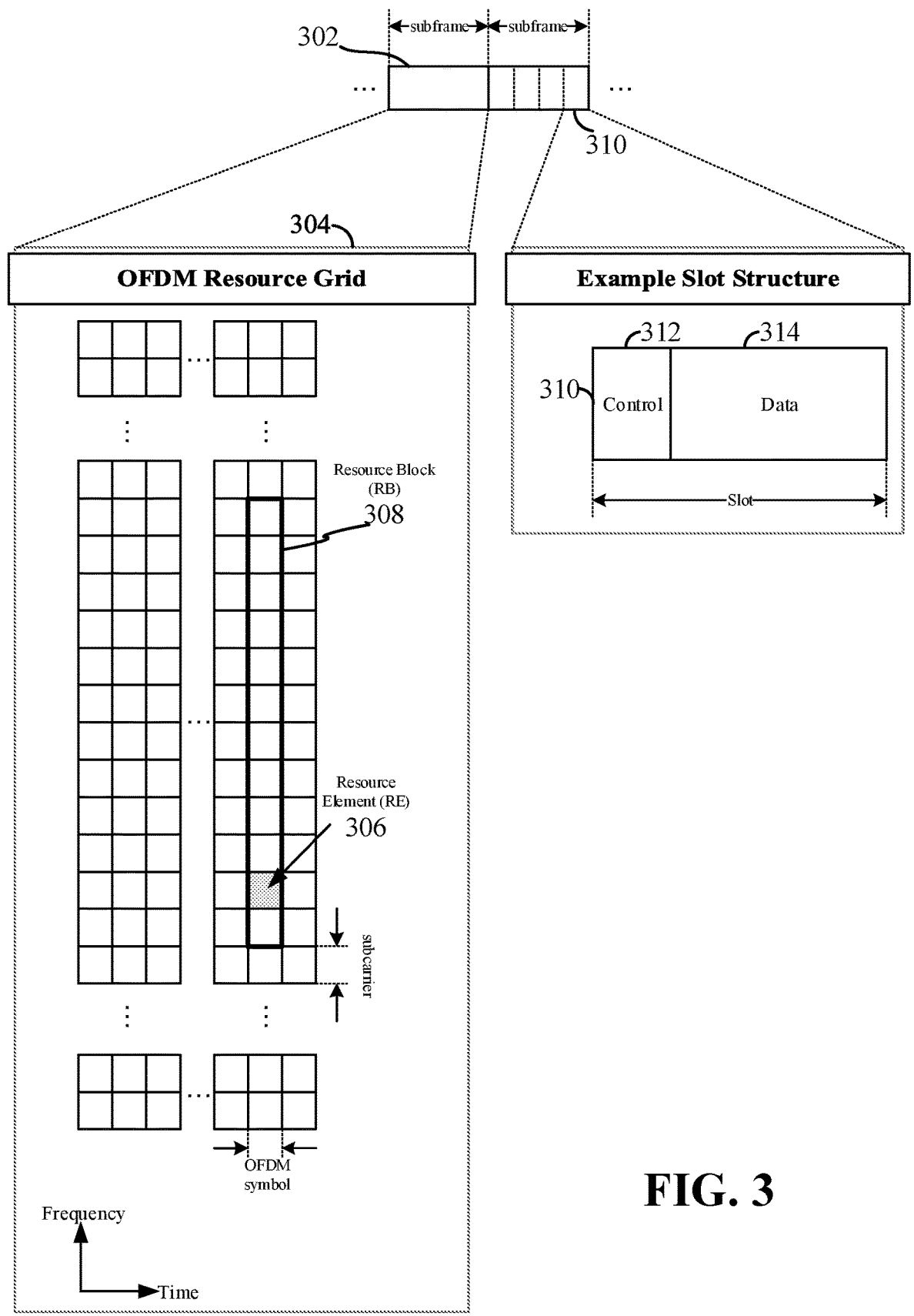
FIG. 3 is a schematic illustration of an organization of wireless resources in an air interface utilizing orthogonal frequency divisional multiplexing (OFDM) according to some embodiments.

Various aspects of the present disclosure utilize an OFDM waveform, an example of which is schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring again to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the base station 108) may allocate one or more REs 306 (e.g., within a control region 312) to carry DL control information 114 (FIG. 1) including one or more DL control channels that generally carry information originating from higher layers, such as a physical broadcast channel (PBCH), a physical downlink control channel (PDCCH), etc., to one or more UEs 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in a synchronization signal block (SSB) that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting UE 106 may utilize one or more REs 306 to carry UL control information 118 (UCI). The UCI can originate from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions.

UL control information 118 may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Enhancements in 5G NR for multi-beam operation have targeted FR2 frequency bands but are also applicable to the FR1 frequency bands. These enhancements have been provided to facilitate more efficient (i.e., lower latency and overhead) DL/UL beam management to support higher intra-cell and L1/L2-centric inter-cell mobility and a larger number of configured transmission configuration indicator (TCI) states. These enhancements may be effected by providing a common beam for data and control transmission/reception for DL and UL, especially for intra-band carrier aggregation (CA). Also, enhancements may be engendered with a unified TCI framework for DL and UL beam indication. Further, enhancements concerning signaling mechanisms for these features can improve latency and efficiency through greater usage of dynamic control signaling as opposed to RRC signaling. Also, enhancements for multi-beam operation may be based on identifying and specifying features to facilitate UL beam selection for UEs equipped with multiple panels, taking into consideration UL coverage loss mitigation due to maximum permissible exposure (MPE) limitations, and based on UL beam indication with the unified TCI framework for UL fast panel selection.

Other enhancements may be for supporting multi-transmission-and-reception-points (multi-TRP) deployment, including targeting both FR1 and FR2 frequency bands. In particular, enhancement may focus on identifying and specifying features to improve reliability and robustness for channels other than PDSCH (i.e., PDCCH, PUSCH, and PUCCH) using multi-TRP or multi-panel with 3GPP Release16 reliability features as the baseline. Additionally, enhancements may concern identifying and specifying QCL/TCI-related enhancements to enable inter-cell multi-TRP operations, assuming multi-DCI based multi-PDSCH reception. Further, beam-management-related enhancements for simultaneous multi-TRP transmission with multi-panel reception may be provided. Still further concerning multi-TRP deployments, enhancements to support high speed train-single frequency network (HST-SFN) deployment scenarios may be provided, such as identifying and specifying solution(s) on QCL assumptions for demodulation reference signal (DMRS) (e.g., multiple QCL assumptions for the same DMRS port(s), targeting DL-only transmissions, or specifying QCL/QCL-like relations (including applicable type(s) and the associated requirement) between DL and UL signals by reusing the unified TCI framework.

Some direction-controlled PAPR reduction embodiments will now be discussed in more detail.

Exemplary Implementations

As discussed earlier, the use of multiple antennas at both the base stations and the UEs enables the use of MIMO having multiple transmission layers (data streams) in both the DL and the UL. Depending upon the number of transmission layers and the number of transmitting antennas, a base station applies a precoding matrix to the transmitted data. The precoding estimates the effect of the channel so that, in an ideal world, the transmitted data arrives at a UE as intended despite the channel effects. In the frequency domain, the data to be transmitted by the base station may be represented by a OFDM frequency-domain vector x. Based upon a precoding matrix W (and assuming a linear processing), the base station generates a vector z that equals the product Wx. In an ideal world, the base station would then transmit a time domain signal a that equals the inverse fast Fourier transform of z. But due to the relatively-high PAPR of OFDM signals, a clipped signal $\hat{\alpha}$ is transmitted instead.

Figure 4:
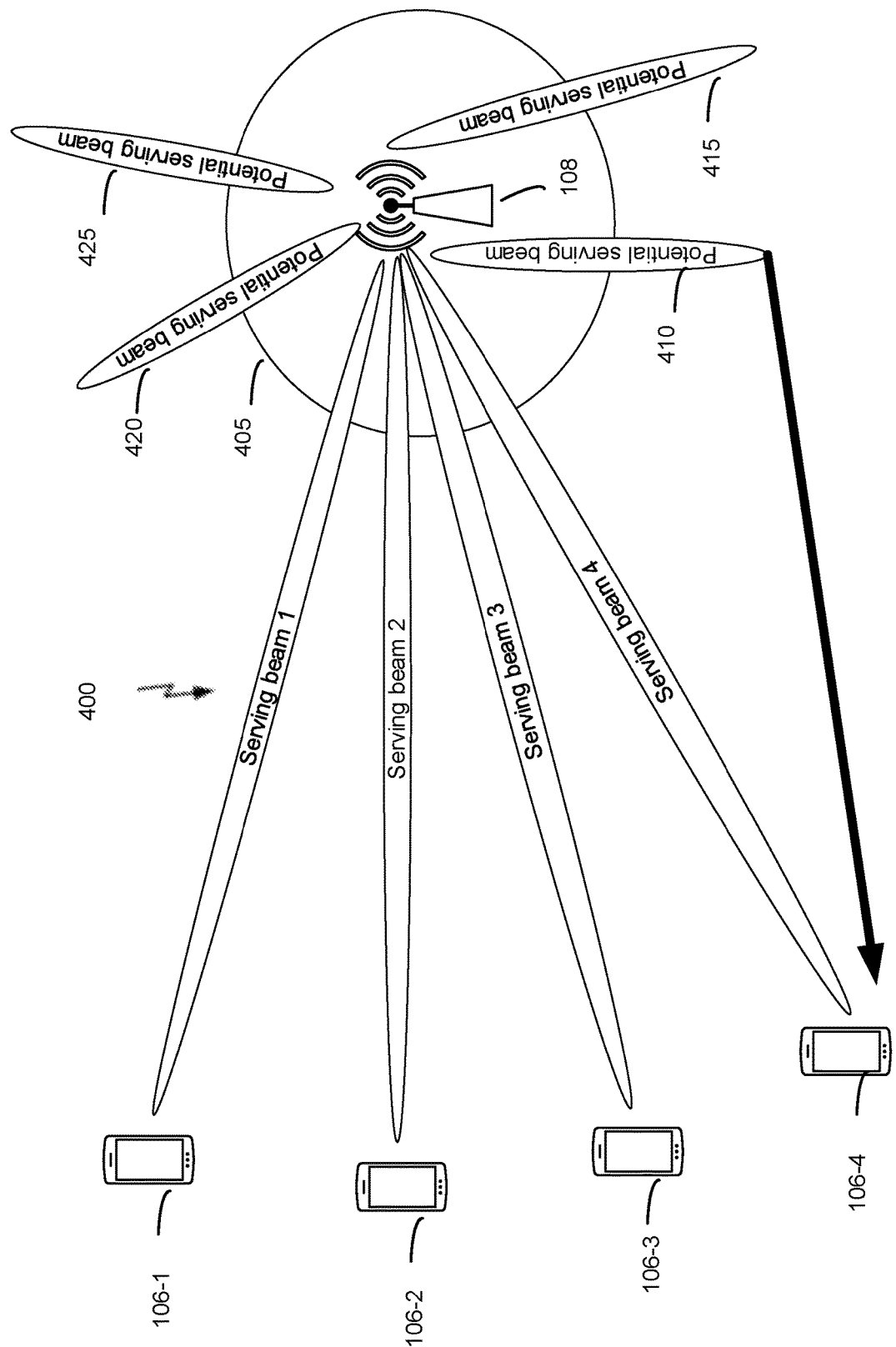
FIG. 4 illustrates a network having direction-controlled PAPR reduction in accordance with an aspect of the disclosure.

In conventional null-space-based PAPR reduction and also the direction-controlled PAPR reduction disclosed herein, the clipped signal $\hat{\alpha}$ may be transformed into the frequency domain such as through a fast Fourier transform to form a frequency domain vector $\hat{z}$. The difference between z and $\hat{z}$ is the clipping noise. Conventional PAPR reduction involves an iterative adjustment of z so that the clipping noise (the PAPR reduction signal) is projected into the null space of the channel matrix $(I-WW^{pinv})$, where I is the identity matrix and $W^{pinv}$ is the pseudo-inverse of the precoding matrix W. In embodiments in which the precoding matrix W is a square matrix, the pseudo-inverse become the actual matrix inverse Although conventional null-space-based PAPR reduction may advantageously increase efficiency for the power amplifier(s) in the transmitting base station, the null space may include directions in which the base station has substantial gain to a scheduled UE. The transmission of the PAPR reduction signal into such directions may then result in self-interference at a UE, despite the directions being within the null space. The direction-controlled PAPR reduction disclosed herein substantially reduces this self-interference while retaining the use of the PAPR reduction signal. Since the production of the PAPR reduction signal is known, the algorithm for its production will not be explained in further detail herein. An example network 400 with direction-controlled PAPR reduction is shown in FIG. 4. A base station 108 is serving four UEs 106 using four serving antenna beams ranging from a first serving antenna beam serving a first UE 106-1 to a fourth serving antenna beam serving a fourth UE 106-4. As used herein, a "serving antenna beam" refers to an antenna beam that serves a UE during a connected mode of operation. A null space 405 represents all the directions that base station 108 can project other antenna beams besides the four serving beams. In that regard, it is conventional for a base station to scan for the acquisition of additional UEs using antenna beams that project into the null space. These potential serving antenna beams are denoted herein as the null-space plurality of antenna beams. In null space 405, the potential serving antenna beams in the null-space plurality of antenna beams includes potential serving antenna beams 410, 415, 420, and 425.

In direction-controlled PAPR reduction, a subset of the potential serving antenna beams is selected from the null-space plurality of antenna beams based upon a reference signal report from one or more of the UEs in a connected mode of operation with the base station. In network 400, UE 106-1, 106-2, 106-3, and 106-4 are all in the connected mode of operation with base station 108. Null space 405 for the MIMO channel to the UEs thus excludes the corresponding serving beams. It would then be conventional for base station 108 to transmit the PAPR reduction signal using its remaining antenna beams such as potential serving antenna beams 410, 415, 420, and 425. Base station 108 uses these potential serving antenna beams to scan for the acquisition of other UEs that could join network 400. Beams 410, 415, 420, and 425 form the null-space plurality of antenna beams for null space 405.

In a conventional PAPR reduction scheme, base station 108 may transmit the PAPR reduction signal using the plurality of null-space antenna beams. But such transmission may result in self-interference at one or more of the connected-mode UEs. Although the null-space plurality of antenna beams is not used to serve any of UEs 106-1 through 106-4, there may still be an appreciable path gain through such beams to one of UEs 106-1 through 106-4. For example, a PAPR reduction signal transmitted in potential serving antenna beam 410 may be scattered relatively strongly to the UE 106-4 served by the fourth serving antenna beam. There would thus be a relatively-high path gain associated with potential serving antenna beam 410 to UE 106-4. This scattering of the PAPR reduction signal may result in self-interference at UE 106-4 such that a transmitted bit error rate to UE 106-4 becomes unacceptably high. To prevent this self-interference, base station 108 practices direction-controlled PAPR reduction that uses a subset of the null-space plurality of antenna beams. For example, potential serving antenna beam 410 may be excluded from the direction-controlled PAPR subset of the null-space antenna beams due to potential serving antenna beam 410 having a path gain that is greater than a threshold level.

In contrast to potential serving antenna beam 410, there are other potential serving antenna beams such as beams 415 and 425 that have relatively small or even no path gain with regard to any of UEs 106-1 through 106-4. Alternatively (or in combination) with avoiding the use of relatively-high path gains such as beam 410, base station 108 may concentrate the PAPR reduction signal into one or both of beams 415 and 425 due to their low-path gain to the served UEs. In such a concentration, a majority of the signal power for the PAPR reduction signal may be transmitted using the low-path-gain antenna beams. Alternatively, the PAPR reduction signal transmission may be limited to solely the use of the low-path-gain antenna beams. In this fashion, the desired PAPR reduction is achieved without any appreciable self-interference through an intelligent selection from the null-space plurality of antenna beams for the transmission of the PAPR reduction signal. It may thus be appreciated that the direction-controlled PAPR reduction results in an intelligent selection of a direction-controlled PAPR subset of antenna beams from the null-space plurality of antenna beams. This selection of the direction-controlled PAPR subset may be such that relatively high-gain antenna beams are excluded and/or such that the PAPR reduction signal power is concentrated into one or more relatively-low-gain antenna beams.

A connected-mode UE in a direction-controlled PAPR reduction network such as UEs 106-1 through 106-4 in network 400 functions to identify those antenna beams (or equivalently, the corresponding transmission directions) from base station 108 that have relatively-high path gains and/or that have relatively-low path gains. With regard to the determination of such path gains, it is conventional for base station 108 to transmit a beam-indexed reference signal in each of the serving antenna beams and in each of the potential serving antenna beams in the null-space plurality of antenna beams. In the potential serving antenna beams, an example of such a reference signal is an SSB that is uniquely indexed to its beam. In the serving antenna beams, an example of such a reference signal is a channel-state-information reference signal (CSI-RS) that is uniquely indexed to its beam.

In a multi-user or single-user MIMO, it is known for a UE to measure the signal quality of its serving beam such as by measuring a signal strength for the corresponding CSI-RS. Based upon these measurements, a UE responds with a reference signal report that assists a base station to identify the proper precoding matrix. To simplify the precoding matrix determination, a UE may be configured with a precoder codebook that includes a plurality of potential precoding matrices. Based upon the received reference signal quality, a UE may then identify a precoding matrix from the precoder codebook and transmit to the base station 108 a precoder-matrix-indicator (PMI) in the CSI-RS that indicates which precoding matrix is suitable.

The identification of the precoding matrix for a UE to the base station 108 then identifies the corresponding serving antenna beam that should be used to serve the UE. In a precoder codebook embodiment, a UE in a direction-controlled PAPR reduction network such as UEs 106-1 through 106-4 in network 400 functions to not only identify the suitable precoding matrix but also other precoding matrices that result in a threshold path gain (e.g., antenna beam 410).

In addition (or alternatively) UEs 106-1 through 106-4 may also function to identify precoding matrices that correspond to the antenna beams with relatively-low path gain (e.g., antenna beams 415 and 425). Since these other precoding matrices are not used by UE 108 to manage the selection of the serving antenna beams, these additional precoding matrices may be denoted as direction-controlled PAPR precoding matrices. The PMI is thus modified in direction-controlled PAPR to not only identify the suitable precoding matrix (which is conventional) but also the direction-controlled PAPR precoding matrices. This is not only non-conventional but also quite advantageous in that base station 108 may proceed to avoid the use of relatively-high-path-gain antenna beams (e.g, beam 410) for the transmission of the PAPR reduction signal and/or concentrate the PAPR reduction signal in the truly null directions (e.g., antenna beams 415 and 425). In a non-codebook-based precoding network, each UE may provide a CSI report that not only identifies the suitable precoding matrix but also these alternative precoding matrices. The identification of the precoding matrices may be transmitted using a MAC CE.

Figure 5:
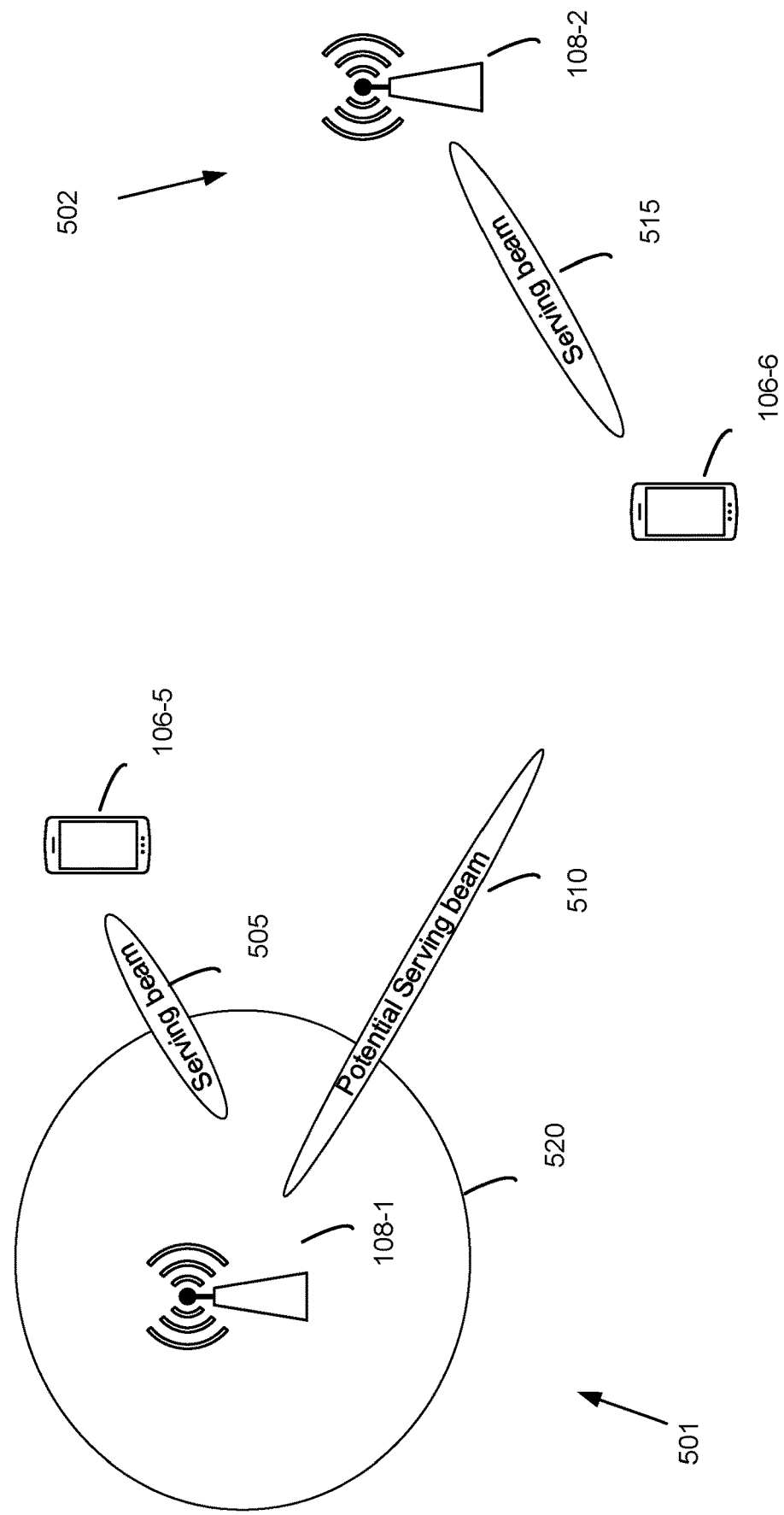
FIG. 5 illustrates a network having direction-controlled PAPR reduction across two adjacent cells in accordance with an aspect of the disclosure.

The direction-controlled PAPR reduction discussed with regard to network 400 may be extended to address interference from other cells. In this fashion, a base station in one cell may avoid transmitting a PAPR reduction signal in directions with relatively-high-path gain to a UE in a neighboring cell. An example network 500 is shown in FIG. 5. A first cell 501 includes a base station 108-1 that serves a UE 106-5 through a serving antenna beam 505. A null-space 520 for base station 108-1 include a potential serving beam 510.

Similarly, a second cell 502 includes a base station 108-2 that serves a UE 106-6 through a serving antenna beam 515. UE 106-6 is relatively adjacent to cell 501 such that potential serving beam 510 from base station 108-1 has a relatively-high path gain to UE 106-6. If base station 108-1 practices a conventional null-space-based PAPR reduction, base station 108-1 may transmit a PAPR reduction signal using beam 510 such that a jamming interference results at UE 106-6. UE 106-6 may thus report the relatively high-path gain of beam 510 to base station 108-1 so that base station 108-1 avoids the use of beam 510 in the transmission of the PAPR reduction signal. In alternative embodiments, this indication may be transmitted through the backhaul 120 (FIG. 1) from base station 108-2 to base station 108-1. Alternatively, UE 106-6 may transmit this indication directly to base station 108-1.

Figure 6:
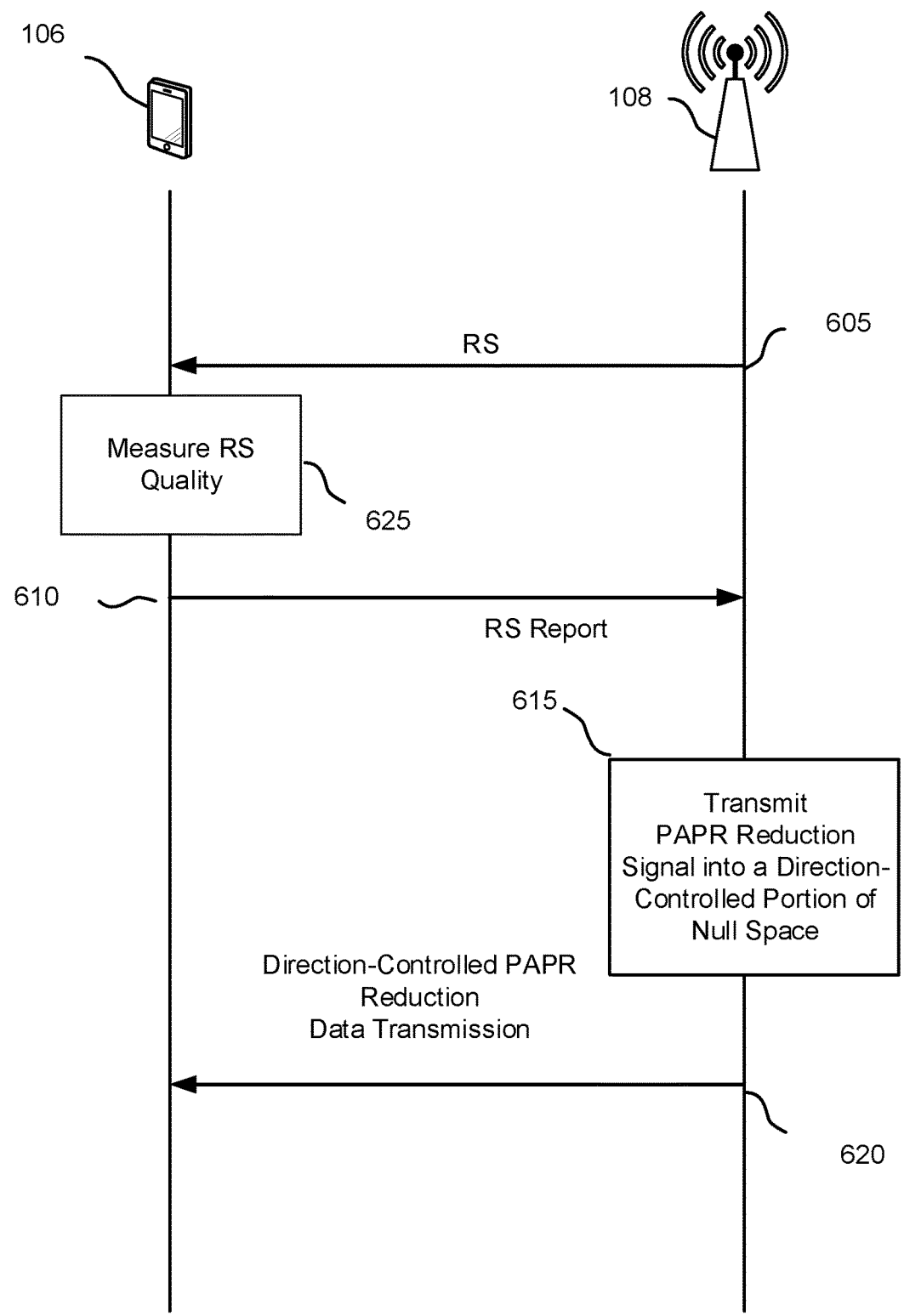
FIG. 6 illustrates a signal flow for direction-controlled PAPR reduction in accordance with an aspect of the disclosure.

Some example signal flows for direction-controlled PAPR reduction are shown in FIG. 6 between a base station 108 and a UE 106. In a step 605, base station 108 transmits a plurality of antenna beams, each beam having its own reference signal (RS) that is uniquely indexed to its beam. As discussed previously, an example of such a reference signal in a serving beam to UE 106 (or to other UEs in a connected mode of operation with base station 108) would be a CSI-RS. In the null-space plurality of antenna beams, an example of the reference signal would be an SSB.

UE 106 may then measure a signal quality or strength for the received reference signals in a step 625. An example of this signal measurement is a reference signal received power (RSRP). Alternatively, UE 106 may measure a received signal strength indicator (RSSI) for each reference signal. In other embodiments UE 106 may measure a reference signal received quality (RSRQ) that is a ratio of the RSRP and the RSSI.

Having measured the reference signal quality or strength, UE 106 may then transmit a direction-controlled reference signal report (RS Report) to base station 108 in a step 610.

As discussed above, a direction-controlled RS report not only identifies a best serving antenna beam but also the identifies to the base station antenna beams that have a path gain above a first threshold and/or have a path gain below a second threshold. The first threshold is greater than the second threshold so that antenna beams with a path gain below the second threshold correspond to antenna beams with relatively-low path gains to UE 106. Conversely, the antenna beams with path gains above the first threshold correspond to antenna beams that may result in self interference at UE 106. In a precoder-codebook-based MIMO embodiment, an example of the RS report would be the transmission of a plurality of PMIs. One of the PMIs would be conventional as it identifies the most suitable precoding matrix based upon the reference signal measurements. But the remaining PMI(s) would be unique to the use of direction-controlled PAPR reduction as they do not identify a precoding matrix that will be used by base station 108 to transmit data to UE 106 but instead are precoding matrices that correspond to the antenna beams (and thus the transmission directions) that base station 108 will either avoid or selectively use for the transmission of the PAPR reduction signal. Base station 108 thus transmits the PAPR reduction signal into the direction-controlled portion of the null space in a step 615. In a step 620 that occurs simultaneously with step 615, base station 108 transmits a data transmission to UE 106 that advantageously has an increased PAPR due to the direction-controlled PAPR reduction.

Figure 7:
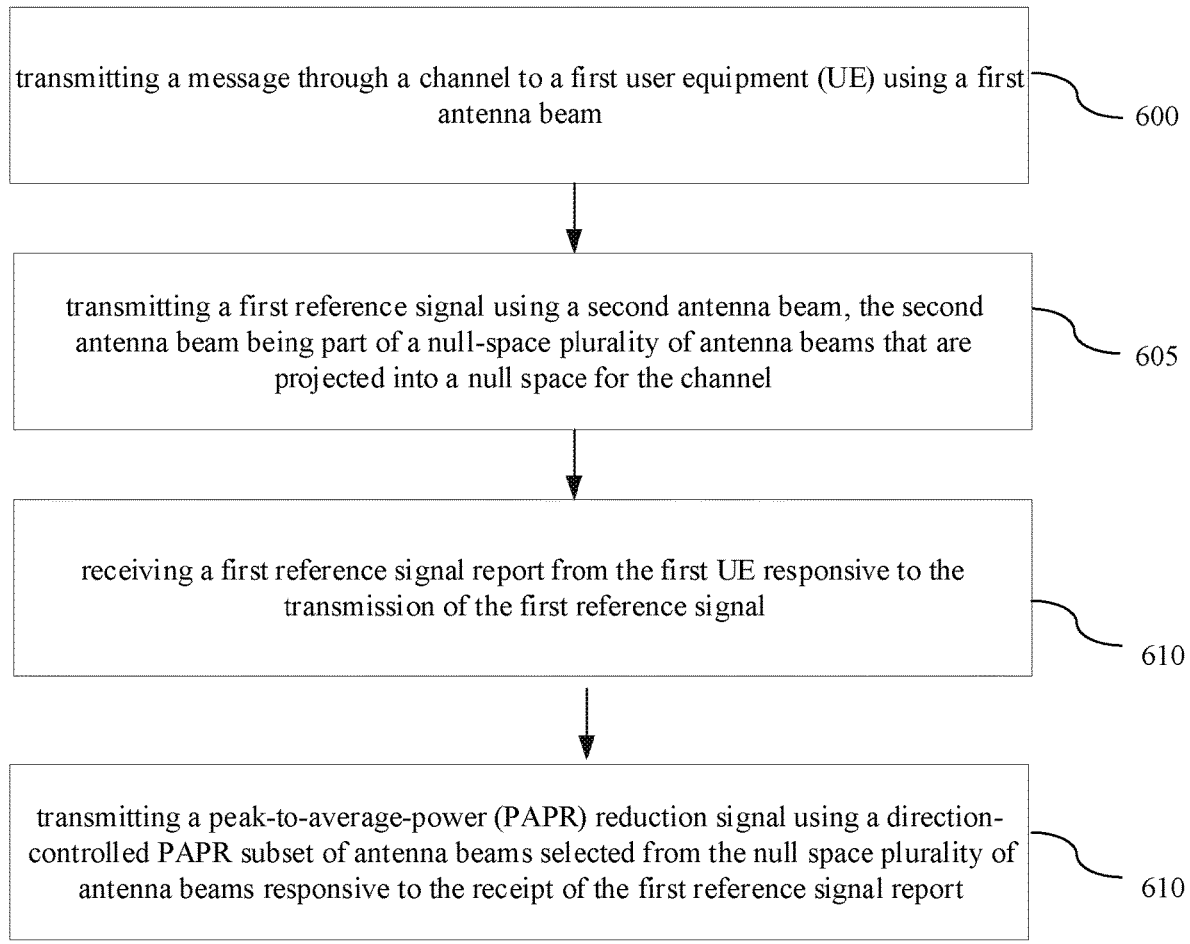
FIG. 7 is a flowchart for an example direction-controlled PAPR reduction at a base station in accordance with an aspect of the disclosure.

A method of operation for a base station with direction-controlled PAPR reduction will now be discussed with regard to the flowchart of FIG. 7. The method includes an act 700 of transmitting a message through a channel to a first user equipment (UE) using a first antenna beam. The transmission of a data signal to any one of UEs 106-1 through 106-4 using the corresponding serving antenna beam is an example of act 700. The method also includes an act 705 of transmitting a first reference signal using a second antenna beam, the second antenna beam being part of a null-space plurality of antenna beams that are projected into a null space for the channel Antenna beams 410, 415, 420, and 425 are an example of the null-space plurality of antenna beams. The method further includes an act 710 of receiving a first reference signal report from the first UE responsive to the transmission of the first reference signal. The receipt at base station 108 of a reference signal report from any of UEs 106-1 through 106-4 is an example of act 710. Finally, the method includes an act 715 of transmitting a peak-to-average-power (PAPR) reduction signal using a direction-controlled PAPR subset of antenna beams selected from the null space plurality of antenna beams responsive to the first reference signal report to reduce a PAPR for the message. The transmission of the PAPR reduction message 615 is an example of act 715.

Figure 8:
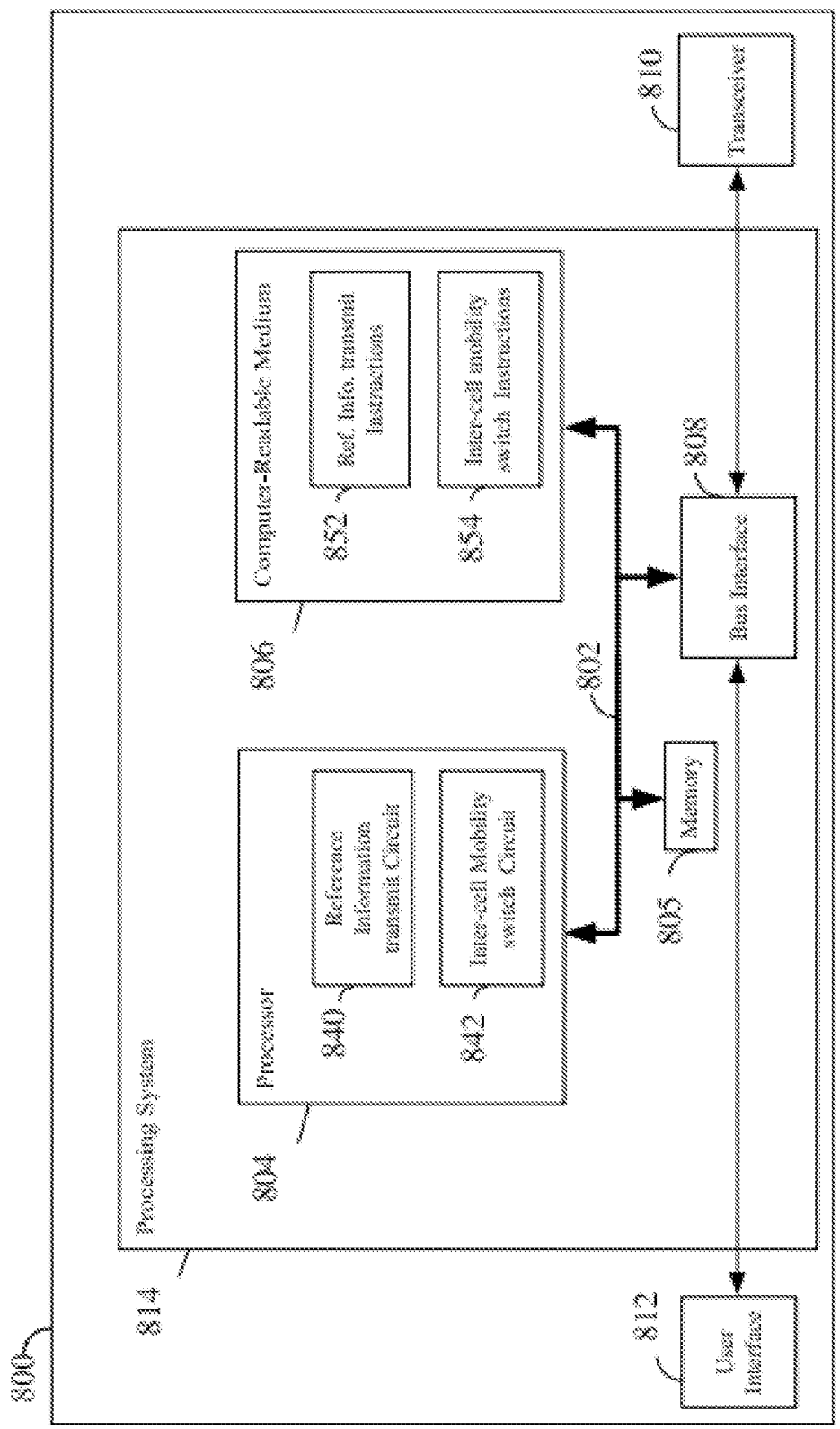
FIG. 8 illustrates an architecture for a network node in network having a direction-controlled PAPR reduction in accordance with an aspect of the disclosure.

An example network node 800 is shown in FIG. 8 that is generic to a UE 106 or a base station 108. Network node 800 includes a processing system 814 having a bus interface 808, a bus 802, memory 805, a processor 804, and a computer-readable medium 806. Furthermore, node 800 may include a user interface 812 and a transceiver 810. Transceiver 810 transmits and receives through an array of antennas (not illustrated).

Processor 804 is also responsible for managing the bus 802 and general processing, including the execution of software stored on the computer-readable medium 806. The software, when executed by the processor 804, causes the processing system 814 to perform clutter-induced interference mitigation disclosed herein. The computer-readable medium 806 and the memory 805 may also be used for storing data that is manipulated by the processor 804 when executing software.

The bus 802 may include any number of interconnecting buses and bridges depending on the specific application of the processing system 814 and the overall design constraints. The bus 802 communicatively couples together various circuits including one or more processors (represented generally by the processor 804), the memory 805, and computer-readable media (represented generally by the computer-readable medium 806). The bus 802 may also link various other circuits such as timing sources, peripherals, voltage regulators, and power management circuits, which are well known in the art, and therefore, will not be described any further. The bus interface 808 provides an interface between the bus 802 and the transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication for a base station, comprising:
   transmitting a message through a channel to a first user equipment (UE) using a first antenna beam;
   transmitting a first reference signal using a second antenna beam, the second antenna beam being part of a null-space plurality of antenna beams that are projected into a null space for the channel;
   receiving a first reference signal report from the first UE responsive to the transmission of the first reference signal; and
   transmitting a peak-to-average-power (PAPR) reduction signal using a direction-controlled PAPR subset of antenna beams selected from the null space plurality of antenna beams responsive to the first reference signal report to reduce a PAPR for the message.

2. The method of claim 1, wherein the second antenna beam is excluded from the direction-controlled PAPR subset of antenna beams responsive to the first reference signal report.

3. The method of claim 2, wherein the reference signal report comprises a precoding matrix indicator identifying a first precoding matrix and a second precoding matrix, and wherein the identification of the second precoding matrix indicates to the base station that the second antenna beam should be excluded from the direction-controlled PAPR subset of antenna beams.

4. The method of claim 1, wherein the first reference signal is a synchronization signal block.

5. The method of claim 1, further comprising:
transmitting a second reference signal using a third antenna beam, wherein the third antenna beam is excluded from the direction-controlled PAPR subset of antenna beams responsive to the first reference signal report.

6. The method of claim 1, further comprising:
receiving a second reference signal report from a second UE that is in a neighboring cell adjacent to a cell served by the base station, the second reference signal report identifying a third antenna beam, and wherein the third antenna beam is excluded from the direction-controlled PAPR subset of antenna beams responsive to the second reference signal report.

7. The method of claim 1, wherein a majority of a signal power for the PAPR reduction signal is transmitted using the second antenna beam responsive to the first reference signal report.

8. The method of claim 7, wherein the PAPR reduction signal is entirely transmitted using the second antenna beam responsive to the first reference signal.

9. The method of claim 1, wherein the first reference signal report is a channel-state information (CSI) reference signal report.

10. The method of claim 9, wherein the CSI reference signal report comprises a received signal power report for the first reference signal.

11. The method of claim 9, wherein the CSI reference signal report comprises a received signal strength indicator report for the first reference signal.

12. The method of claim 9, wherein the CSI reference signal report comprises a reference signal received quality report for the first reference signal.

13. The method of claim 1, wherein the first reference signal report comprises a media access control (MAC) control element.

14. A base station, comprising:
a transceiver; and
a processor configured to:
command the transceiver to transmit a message through a channel to a first user equipment (UE) using a first antenna beam;
command the transceiver to transmit a first reference signal using a second antenna beam, the second antenna beam being part of a null-space plurality of antenna beams that are projected into a null space for the channel;
process a first reference signal report from the first UE responsive to the transmission of the first reference signal; and
command the transceiver to transmit a peak-to-average-power (PAPR) reduction signal using a direction-controlled PAPR subset of antenna beams selected from the null-space plurality of antenna beams responsive to the processing of the first reference signal report.

15. The base station of claim 14, wherein the processor is further configured to command the transceiver to exclude the second antenna beam from the direction-controlled PAPR subset of antenna beams responsive to the processing of the first reference signal report.

16. The base station of claim 15, wherein the reference signal report comprises a precoding matrix indicator identifying a first precoding matrix and a second precoding matrix, and wherein the identification of the second precoding matrix indicates to the processor that the second antenna beam should be excluded from the direction-controlled PAPR subset of antenna beams.

17. The base station of claim 14, wherein the processor is further configured to process a second reference signal report from a second UE that is in a neighboring cell adjacent to a cell served by the base station, the second reference signal report identifying a third antenna beam, and wherein the processor is further configured to command the transceiver to exclude the third antenna beam from the direction-controlled PAPR subset of antenna beams responsive to the processing of the second reference signal report.

18. The base station of claim 14, wherein the processor is further configured to command the transceiver to transmit a majority of a signal power for the PAPR reduction signal using the second antenna beam responsive to the processing of the first reference signal report.

19. The base station of claim 14, wherein the first reference signal report is a channel-state information (CSI) reference signal report.

20. The base station of claim 19, wherein the CSI reference signal report comprises a received signal power report for the first reference signal.

21. The base station of claim 19, wherein the CSI reference signal report comprises a received signal strength indicator report for the first reference signal.

22. A method of wireless communication for a user equipment (UE), comprising:
receiving a first reference signal over a first serving antenna beam from a base station;
receiving a second reference signal over a second antenna beam from the base station;
selecting a first precoding matrix responsive to a processing of the first reference signal;
selecting a second precoding matrix responsive to a processing of the second reference signal;
transmitting a reference signal report to the base station that identifies the first precoding matrix and the second precoding matrix; and
receiving a message from the base station over the first serving beam having an increased peak-to-power ratio (PAPR) responsive to the transmission of the reference signal report.

23. The method of claim 22, wherein the processing of the second reference signal indicates that a signal power of the second reference signal is greater than a threshold level.

24. The method of claim 22, wherein the processing of the second reference signal indicates that a signal power of the second reference signal is less than a threshold level.

25. The method of claim 22, wherein the reference signal report comprises a precoding-matrix indicator.

26. The method of claim 22, wherein the reference signal report comprises a media access control (MAC) control element.

27. A user equipment, comprising:
a transceiver configured to receive a first reference signal over a serving antenna beam from a base station and configured to receive a second reference signal over a null-space antenna beam from the base station, and
a processor configured to select a first precoding matrix responsive to a processing of the first reference signal and to select a second precoding matrix responsive to a processing of the second reference signal, the processor being further configured to command the transceiver to transmit a reference signal report to the base station that identifies the first precoding matrix and the second precoding matrix, wherein the transceiver is further configured to receive a message over the serving antenna beam from the base station having an increased peak-to-average power ratio (PAPR) responsive to the transmission of the reference signal report.

28. The user equipment of claim 27, wherein the processor is configured to select the second precoding matrix responsive to a signal power of the second reference signal being greater than a threshold value.

29. The user equipment of claim 27, wherein the processor is configured to select the second precoding matrix responsive to a signal power of the second reference signal being less than a threshold value.

30. The user equipment of claim 27, wherein the reference signal report comprises a precoding-matrix indicator.

31. The user equipment of claim 27, wherein the reference signal report comprises a media access control (MAC) control element.

* * * * *